(12) United States Patent
Joffe et al.

(10) Patent No.: US 10,595,090 B2
(45) Date of Patent: Mar. 17, 2020

(54) SYSTEM AND METHOD FOR OPTIMIZED AND EFFICIENT INTERACTIVE EXPERIENCE

(71) Applicants: Sony Corporation, Tokyo (JP); Sony Pictures Entertainment Inc., Culver City, CA (US)

(72) Inventors: Paul B. Joffe, Los Angeles, CA (US); Geremie Camara, Culver City, CA (US); Harry Friedman, Westlake Village, CA (US)

(73) Assignees: SONY CORPORATION, Minato-Ku (JP); SONY PICTURES ENTERTAINMENT INC., Culver City, CA (US)

( * ) Notice: Subject to any disclaimer, the term of this patent is extended or adjusted under 35 U.S.C. 154(b) by 0 days.

(21) Appl. No.: 15/680,314

(22) Filed: Aug. 18, 2017

(65) Prior Publication Data
US 2018/0070143 A1    Mar. 8, 2018

Related U.S. Application Data

(60) Provisional application No. 62/382,967, filed on Sep. 2, 2016.

(51) Int. Cl.
| H04H 60/33 | (2008.01) |
| H04N 21/475 | (2011.01) |
| G06F 16/738 | (2019.01) |
| G06F 16/78 | (2019.01) |
| G06F 16/9535 | (2019.01) |
| H04N 21/41 | (2011.01) |

(Continued)

(52) U.S. Cl.
CPC ....... H04N 21/4758 (2013.01); G06F 16/738 (2019.01); G06F 16/7867 (2019.01); G06F 16/9535 (2019.01); H04N 21/4126 (2013.01); H04N 21/42203 (2013.01); H04N 21/4781 (2013.01); H04N 21/47217 (2013.01);
(Continued)

(58) Field of Classification Search
CPC ........... H04N 21/4758; H04N 21/4781; H04N 21/4788; H04N 21/8173
See application file for complete search history.

(56) References Cited

U.S. PATENT DOCUMENTS

| 5,813,913 A | 9/1998 | Berner |
| 6,193,610 B1 | 2/2001 | Junkin |

(Continued)

FOREIGN PATENT DOCUMENTS

| CN | 102737631 A | 10/2012 |
| JP | 2009509717 A | 3/2009 |

OTHER PUBLICATIONS

Author Unknown "CREA: Defining future multiplatform interaction on TV shows through a user experience study", published Jun. 2011, 11 pages.

Primary Examiner — Gigi L Dubasky
(74) Attorney, Agent, or Firm — Mayer & Williams, PC

(57) ABSTRACT

Systems and methods are disclosed to implement a technique for viewer interaction and participation while viewing content. In one implementation, a computer system executing a software application presents video content to a user and receives user input at selected points of interaction during the presentation. The system provides feedback to the user according to the received input and information associated with the video content. In one example, this presentation, input, and feedback forms a game experience for the user.

33 Claims, 6 Drawing Sheets

(51) Int. Cl.
  *H04N 21/422*  (2011.01)
  *H04N 21/472*  (2011.01)
  *H04N 21/478*  (2011.01)
  *H04N 21/81*   (2011.01)
  *H04N 21/2187* (2011.01)
  *H04N 21/4788* (2011.01)

(52) U.S. Cl.
  CPC ..... *H04N 21/8173* (2013.01); *H04N 21/2187* (2013.01); *H04N 21/4788* (2013.01)

(56) References Cited

U.S. PATENT DOCUMENTS

| | | | | |
|---|---|---|---|---|
| 2007/0028272 | A1* | 2/2007 | Lockton | H04H 20/38 725/62 |
| 2009/0089838 | A1* | 4/2009 | Pino, Jr. | G06Q 30/02 725/40 |
| 2009/0300143 | A1* | 12/2009 | Musa | H04N 7/17318 709/218 |
| 2009/0318205 | A1* | 12/2009 | Wardlow | A63F 9/24 463/1 |
| 2011/0135278 | A1* | 6/2011 | Klappert | G06F 17/241 386/278 |
| 2012/0265527 | A1* | 10/2012 | Xiong | G10L 15/08 704/235 |
| 2013/0268951 | A1* | 10/2013 | Wyatt | H04N 21/25866 725/5 |
| 2013/0290001 | A1* | 10/2013 | Yun | G10L 15/00 704/275 |
| 2014/0282676 | A1* | 9/2014 | Joergens | H04N 21/4758 725/23 |

* cited by examiner

SYSTEM AND METHOD FOR OPTIMIZED AND EFFICIENT INTERACTIVE EXPERIENCE

CROSS-REFERENCE TO RELATED APPLICATIONS

This application claims benefit of priority to U.S. Provisional Patent Application Ser. No. 62/382,967, filed Sep. 2, 2016, entitled "VIDEOGAME PARTICIPATION", owned by the assignee of the present application, and herein incorporated by reference in its entirety.

FIELD

The invention relates to processing speed and efficiency in interactive applications.

BACKGROUND

Prior interactive applications have been hindered by, among other things, disparate communication paths, and in some cases no communication paths at all. For example, it is an unmet goal where users are enabled to "play along with their TV" in an effective manner, i.e., to have some involvement with what is being displayed on the screen, rather than simply a passive experience.

Such efforts have been hindered by the lack of technological improvements in this area. As one initial effort, small handheld devices were developed to allow users to keep track of their own score, e.g., as they play along with a game of Jeopardy®. Such efforts are an example of no communication paths, and are limited by the user's speed at keeping track of the various answers and questions, as well as the inherent inaccuracies in user self-monitoring.

In more advanced efforts, so-called "second screens" have been employed. But these too were hindered by limitations related to the user's speed at button pushing, by disparate communication paths, and were often viewed by critics as an inferior "look-down, look-up, look-down, look-up" approach, i.e., a non-seamless, experience.

Other related efforts include those related to polling, such as in certain televised town hall meetings, as well as reality show competitions in which users are allowed to vote by employing second screens to input votes or user choices that are then tallied and displayed. The intention and result of such efforts just information gathering, and lacks aspects of a full interactive experience.

In general, many technological barriers can be understood to be attendant to such efforts. These include inferior voice recognition technology, the lack of prior advanced remote controls, and limitations on content delivery.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles meet the needs of the above in several ways. In part, systems and methods employ advancements in voice-recognition technology, advances in available remote controls, such as smart phones, particularly as input sources, as well as advances in streaming and wireless technologies so as to result in a technologically- and optimized interactive experience. For example, users may have a "user computer" such as a smart phone that is connected to a Wi-Fi network, and may further have a "content playback device" such as an IPTV that is also connected to the Wi-Fi network, in such connected systems may be employed to effectively operate systems and methods according to present principles by layering applications related to gaming, viewing, voice, and other UI components into a single technologically-optimized interactive experience.

In a particular implementation, apparatus and methods are disclosed to implement a technique for viewer interaction and participation while viewing content. In one implementation, a computer system executing a software application presents video content to a user and receives user input at selected points of interaction during the presentation. The system provides feedback to the user according to the received input and information associated with the video content. In one example, the presentation, input, and feedback forms a game experience for the user.

In an even more specific implementation, users "play" against each other as part of a multiplayer experience or game, where interactions can take place using a central server architecture or a peer-to-peer network. In one version the users use their voice to enter input, e.g., answers to questions. In this version the users use voice to play a unique and separate interactive experience over streaming video with others located anywhere using a standard network.

Features provided in implementations can include, but are not limited to, one or more of the following: using recorded video with tags for interactive "play along" gameplay with voice UI, pausing and restarting video, and tagging video for game interaction.

In one aspect, the invention is directed towards a method of operating an interactive experience based on a main item of content in which one or more database entries, associated with users and based on user interactions within the interactive experience, are more effectively and accurately populated, the method including steps of: playing a main item of content on a user content playback device, the main item of content including one or more subsets of content, one or more of the subsets of content indicating a query and inviting a response by a user; during the playing of the main item of content, receiving user-entered data from a user computer, the user-entered data including a response to a query indicated by the subset of the main item of content; comparing the received user-entered data with a predefined response to the query; determining a user score based on a result of the comparison, and adding the determined user score to a total score associated with the user and stored as an entry in a database; displaying the total score; and repeating the receiving, comparing, determining, adding, and displaying, for one or more of the subsets indicating a query and inviting a response by the user.

Implementations of the invention may include one or more of the following. The method may further include receiving an indication from a user that the main item of video content should begin playback, and upon the receiving an indication, starting the playing. The causing to be rendered may include streaming a live item of video content. The causing to be rendered may include playing back a recorded item of video content. The user computer may be a mobile device, laptop, or digital personal assistant. The user computer may be integral with the user content playback device. The user entered data may be voice data or transcribed voice data. The method may further include performing voice recognition on the user entered data to transform the user entered data into first textual data, and where the predefined response is encoded as second textual data within the main item of content, and where the comparing is of the first textual data to the second textual data.

The method may further include, during the playing of the main item of content, receiving another user-entered data from another user computer, the another user-entered data including another response to the query indicated by the subset of the main item of content; comparing the received another user-entered data with the predefined response to the query; determining a user score for the another user computer based on a result of the comparison, and adding the determined user score to a total score stored as an entry in a database associated with the another user; displaying the total score; and e. repeating the receiving, comparing, determining, and displaying, for a plurality of the subsets indicating a query and inviting a response by the another user. The method may further include pausing the playing of the main item of content at a predetermined point within the playing of the subset, and unpausing the playing after the step of determining a user score. If no response is received from the user within a predetermined time subsequent to the pausing, then the method may further include unpausing the playing of the main item of content after the expiration of the predetermined time. The playing a main item of content may include receiving and rendering data corresponding to the main item of content, and where a set of data indicating the predefined response is included in the received data. The set of data indicating the predefined response may be encoded as metadata within an associated subset. The set of data indicating the predefined response may be received as part of a transmission that is separate from a transmission causing the playing of the main item of content. The query inviting a response indicated by the subset, and the displaying, may be rendered as an overlay atop the playing of the main item of content.

The method may further include, during the playing of the main item of content, retrieving a previously-entered user-entered data corresponding to another user, the previously-entered user-entered data including another response to the query indicated by the subset of the main item of content; comparing the previously-entered user-entered data with the predefined response to the query; determining a user score for the another user based on a result of the comparison, and adding the determined user score to a total score stored as an entry in a database associated with the another user; displaying the total score; repeating the receiving, comparing, determining, and displaying, for a plurality of the subsets indicating a query and inviting a response by the another user. The another user may be selected by the user or randomly selected for the user. The main item of content may be embodied as content data, and the playing of the main item of content may constitute rendering the content data with an appropriate audio and/or video codec. The method may further include storing metadata pertaining to the interactive experience as an interaction map, the interaction map including a collection or list of interaction points, each interaction point indicating a location in the content data. Each subset may correspond to an interaction point. The location in the content data may be represented using an element selected from the group consisting of: a time, a video frame, a visual or audio watermark or fingerprint, a video tag, a metadata tag, or a data pattern. The method may further include that, associated with each interaction point, is at least one associated event information, the associated event information indicating how to process the interaction point. The associated event information may be selected from the group consisting of: a prompt, a question, a notification, an update, a condition, and a branch. The associated event information may further include secondary information, and the secondary information may be selected from the group consisting of: an answer to a question, a value of an answer, an effect of a response, a condition, and an indication of a branch to take based on a response. The secondary information may be a condition, and the condition may be that the associated event will or will not occur based on the occurrence of the condition. Each interaction point may be associated with a tree of events, each event having at least one associated condition and one associated action to perform based on the occurrence of the condition. The associated action to perform may be further based on a state of the interactive experience and user input.

In another aspect, the invention is directed towards a system for operating an interactive experience based on a main item of content in which one or more database entries, associated with users and based on user interactions within the interactive experience, are more effectively and accurately populated, including: a content player, the content player configured to play a main item of content on a user content playback device, the main item of content including one or more subsets of content, one or more of the subsets of content indicating a query and inviting a response by a user; a programmed processor configured to operate an interactive experience; a user API configured to receive user-entered data from a user computer, the user-entered data including a response to a query indicated by the subset of the main item of content, the user API further configured to transmit the user-entered data to the programmed processor; where the programmed processor is further configured to compare the received user-entered data with a predefined response to the query, to determine a user score based on a result of the comparison, and to add the determined user score to a total score associated with the user and stored as an entry in a database; where the programmed processor is further configured to operate a user interface for the interactive experience, and to display the total score as a portion of the user interface.

Implementations of the invention may include one or more of the following. The system may be distributed. The content player, the programmed processor, and the user API may be on one or more computers within a local network, and the main item of content may be streamed from a content server. The user API may be a voice API, and the voice API may be further configured to transmit user entered voice data to a cloud server for voice recognition.

Systems and methods according to present principles in some implementations generally relate to determining if user entered data is associated with a predefined answer, e.g., if the user answers correctly. Such may be compared to prior efforts, e.g., online polling, in which information is gathered, but there is no step of comparing a user answer with a predefined response, i.e., of predefined responses or having user entered data compared to a predefined correct answer. Even in cases where systems and methods according to present principles are applied to queries in which multiple-choice answers are provided, a step is employed of determining if user entered data is associated with one of the multiple-choice answers, and an entry in a database is modified in part based on a result of the comparison.

Advantages of the invention may include, in certain embodiments, one or more of the following. Systems and methods according to present principles can provide for more rapid and efficient processing of user responses to queries, such that database entries pertaining to user performance are rendered more accurately and are more efficiently calculated. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

Figure 1:
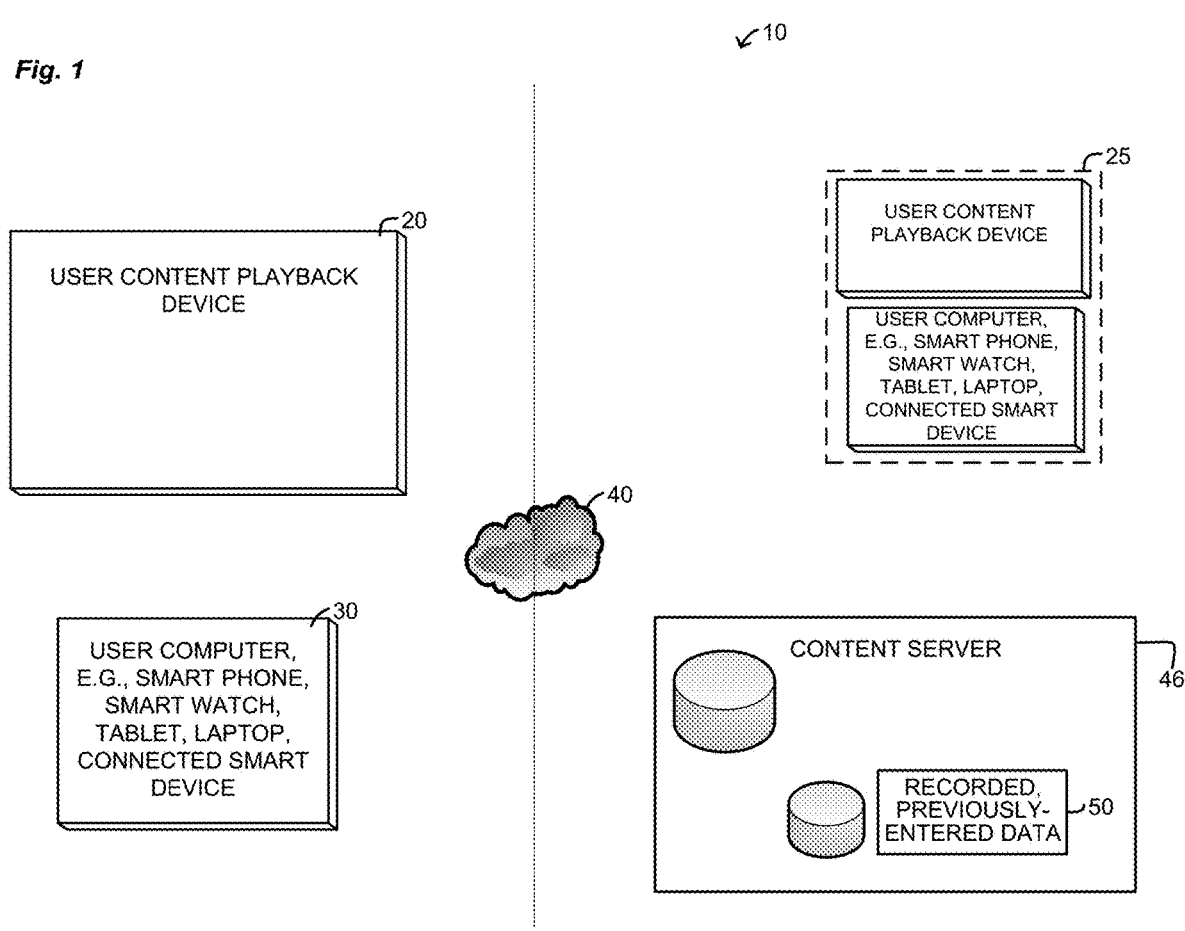
FIG. 1 shows an exemplary schematic diagram illustrating a system according to one implementation of present principles.

FIG. 1 shows an overview of one implementation of systems and methods according to present principles, here illustrated as a viewer participation system 10. The system 10 includes a user content playback device 20 and a user computer 30. The user computer 30 may be, e.g., a smart device, tablet, laptop, or other device capable of receiving user entered data, which in many cases is user-entered voice data, i.e., uttered speech or a vocalization of the user. While in many cases the user computer will be embodied by a smart phone, the term may encompass smart remotes or other voice-enabled devices.

In some cases the user computer 30 can be implemented within the user content playback device 20 as user input functionality. In particular, the user content playback device, e.g., television such as an IPTV, may include an integral or attached microphone for voice input functionality. The user content playback device 20 and the user computer 30 are connected through the internet 40 to a content server 46. The content server 46 can stream or download main items of content for playback on the content playback device 20. The user using content playback device 20 and user computer 30 may also be in signal communication with other user systems 25, so as to allow multiuser interactive experiences. The content server 46 can be employed to run the interactive experience as well as to stream main items of content. In some cases, running the interactive experience may further include employing recorded and stored previously entered data 50, so as to allow a user to asynchronously play against another opponent.

Figure 2:
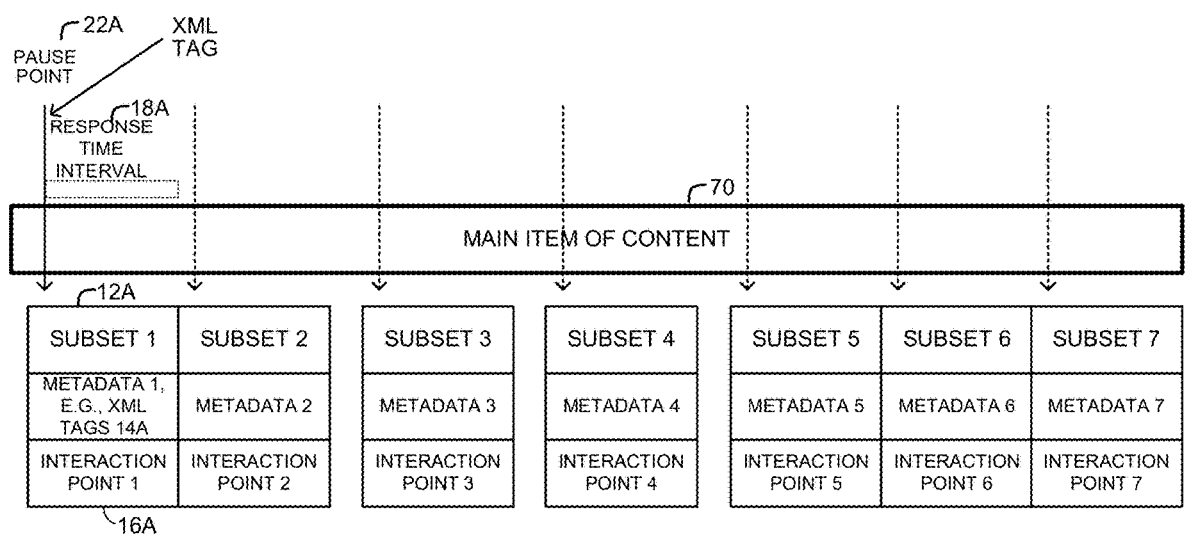
FIG. 2 illustrates a data structure of a main item of content, illustrating multiple subsets which may include metadata tags identifying interaction points.

FIG. 2 illustrates a main item of content 70. The main item of content 70 can be comprised of a plurality of subsets, one of which is shown as subset 1 or element 12A. Each subset may include a query that invites a response from a user. The query is often a question, but can also be more complex than a question or minimal as well, e.g., simply a color which a child is invited to guess the name of. The subsets are generally logical units. The subsets can include video and/or audio data comprising a portion of the main item of content, and can be associated with (or encoded with) respective metadata 14A. The metadata 14A can include data such as a predefined response (or a pointer thereto), e.g., a correct answer, tags such as XML tags indicating an appropriate pause point 22A, alternative correct responses (or pointers thereto), and so on. A response time interval 18A may also be defined, where a response by a user has to be given within the response time interval or the same will not count as a correct or incorrect response by the user. The response time interval 18A may be the same for each subset, or may vary between subsets, e.g., depending on the complexity of the query. While in many cases the pause point will be defined by an XML tag, the same may be defined in other ways, dictated by the situation. For example, the pause point may be defined as the frame present when a user indicates a desire to respond, e.g., "buzzes in" to give an answer. As will be described later, the pause point may be defined as the closest clue frame present when a user indicates such a desire to respond, e.g., the closest frame tagged with meta-data indicating that a clue or query is present. In particular, metadata tags may be provided for each frame to indicate whether the frame is a query frame or a non-query frame, as it is in many cases desired to pause on a query frame and not on a non-query frame, e.g., a frame in which a picture of a contestant is shown.

In this regard it is noted that the main item of content may be in certain implementations a previously-recorded content item, e.g., a prerecorded game show. For this reason, pausing is generally required to allow users of present systems and methods to provide an answer before the prerecorded contestant does. In addition, depending on how fast the prerecorded player buzzed in, the location of the XML tag indicating a pause point may be required to be placed in a custom location for each subset. In other words, the placement of an XML tag indicating a pause point may vary from subset to subset even within the same content item, as some queries may have had prerecorded contestants buzzing in quickly while others more slowly or not at all.

Figure 3:
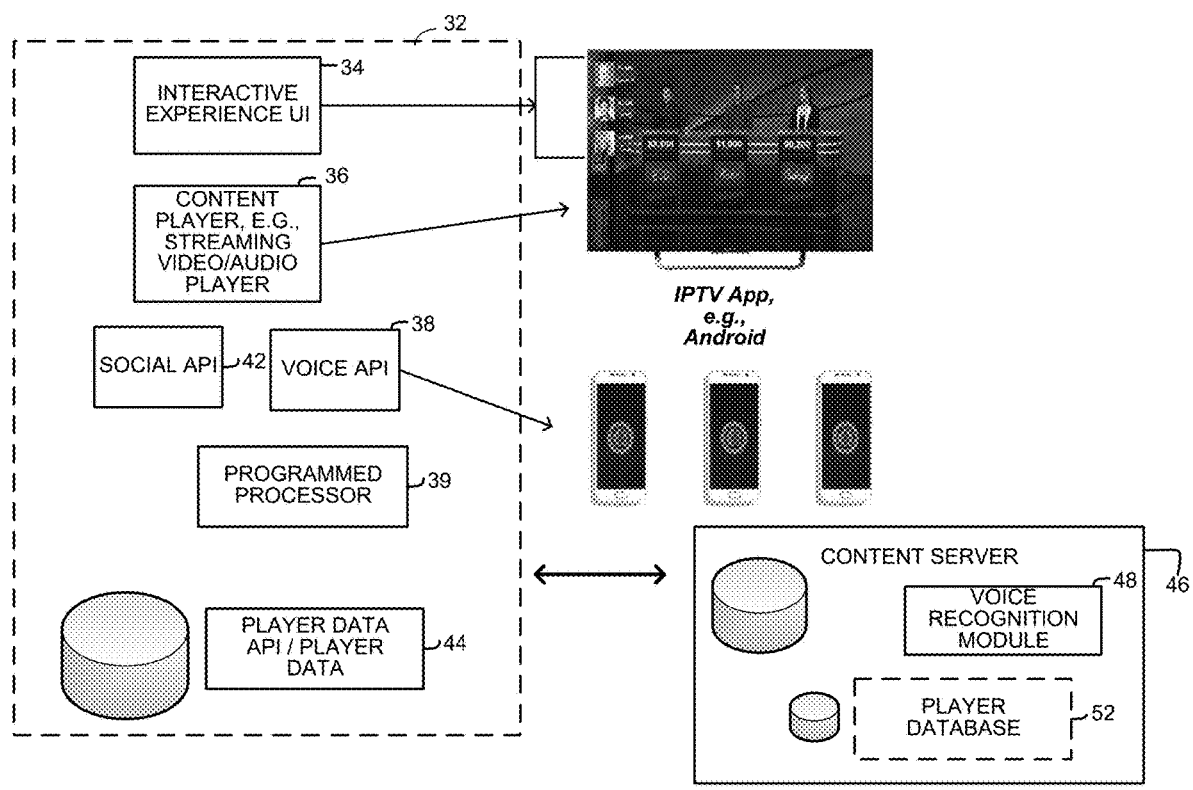
FIG. 3 is another exemplary schematic diagram, showing devices involved in the user interactive experience in greater detail, as well as logical units performing various steps, along with a content server. The figure also shows a UI for the interactive experience overlaid atop a main item of content.

FIG. 3 illustrates a more detailed implementation of present systems and methods. The system 32 comprising the interactive experience may include a content player 36, which may be a streaming video player, e.g., software application, e.g., an Android® app, which is stored and operated on a content playback device such as an IPTV or other television, presenting content and a user interface through the television display and audio. An interactive experience UI 34, e.g., a game or participation UI, may be generated and presented on top of the main item of content, e.g., video content. The television may have a network connection, wired or wireless, providing access to a content server 46, e.g., through the internet. The content server 46 may provide streaming content and metadata and may receive inputs and feedback data from the system 32. The system 32 has, or has access to, a voice API 38, a social API 42, and a player data API 44.

The voice API 38 provides speech recognition and speech-to-text conversion processing. The social API 42 provides and stores information and provides interaction with social data for a user, such as friend information, e.g., identification, preferences, activity, and recommendations, as well as social network service data in communications. The player data API 44 provides and stores information for a user, e.g., the player, and their experience with the participation interactive user experience system, e.g., past performance, scores, questions, etc. The system 32 including television and/or other display also has a wireless connection to a user computer such as a mobile device, e.g., via Wi-Fi. The user computer may be embodied as a smart phone or tablet or other device operated by the user. The television and mobile device exchange information to provide user input and feedback, e.g., question prompts or queries and user answers.

The steps described above performed by system 32 are generally performed by appropriate operations through a programmed processor 39.

Referring back to FIG. 2, as noted the main item of content has associated metadata 14, e.g., XML data. In one implementation, the metadata indicates points of interaction 16, e.g., interaction point 16A, or tags in the video content, such as by timestamp or by frame number. As the video player plays the content, the video player uses the metadata to locate the interaction points. For example, a video player may pause video playback when a tag is reached, e.g., when a timer in the player reaches the timestamp for the tag, e.g., at the point in time in the video when a question has been asked, and provides an opportunity for user input, e.g., an answer to the question. The video player analyzes the user input to determine appropriate feedback, e.g., whether the answer was correct, and further determines an effect on a user score, as described below.

Figure 4:
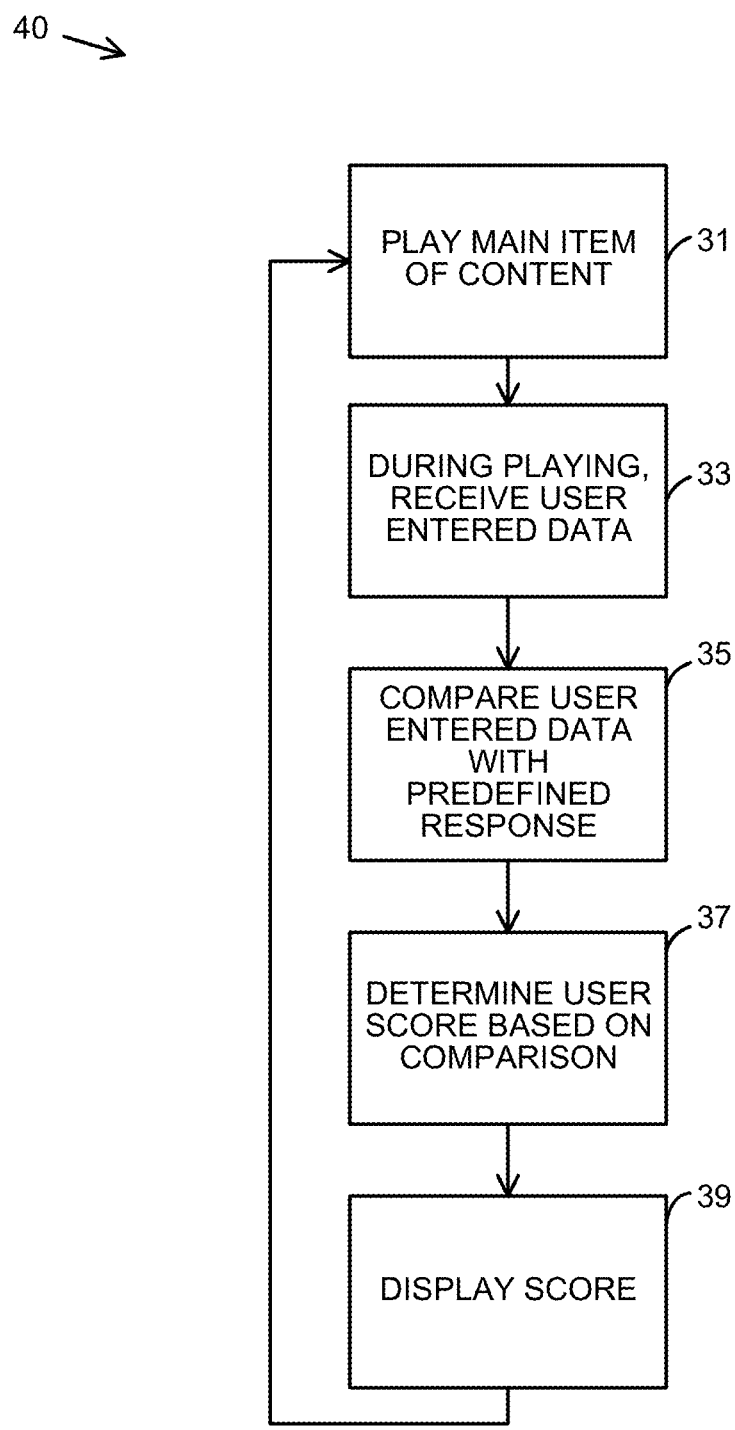
FIG. 4 is a flowchart of a method according to present principles.

FIG. 4 illustrates a flow chart 40 of an exemplary method according to present principles. In a first step, a main item of content is played (step 31). During the playing, user-entered data is received (step 33). The user-entered data is then compared with the predefined response (step 35). A user score is determined based on the comparison (step 37), and the score is displayed.

In an example using a recording of a question and answer game show, contestants are presented with questions and provide answers during a limited time period, e.g., a television game show such as "Jeopardy!"™. Video data recording a live event of contestants playing the game is stored and tagged with metadata for each question and answer, e.g., timestamps, correct answers, and so on. A home player can watch the game on a television, connected to a server and to a smartphone, e.g., watching during a broadcast or a recording, or by streaming or download. As the game plays, based on the metadata, the home player is prompted to answer each question and can provide answers by speaking into the smartphone. Thus the user need not laboriously type in answers, and in fact can play along at or near real-time. Video playback can adjust to meet player timing. The home player's answers are processed and evaluated for correctness and score. The home player's running score and results are displayed on the screen, along with the video of the live gameplay.

Figure 5:
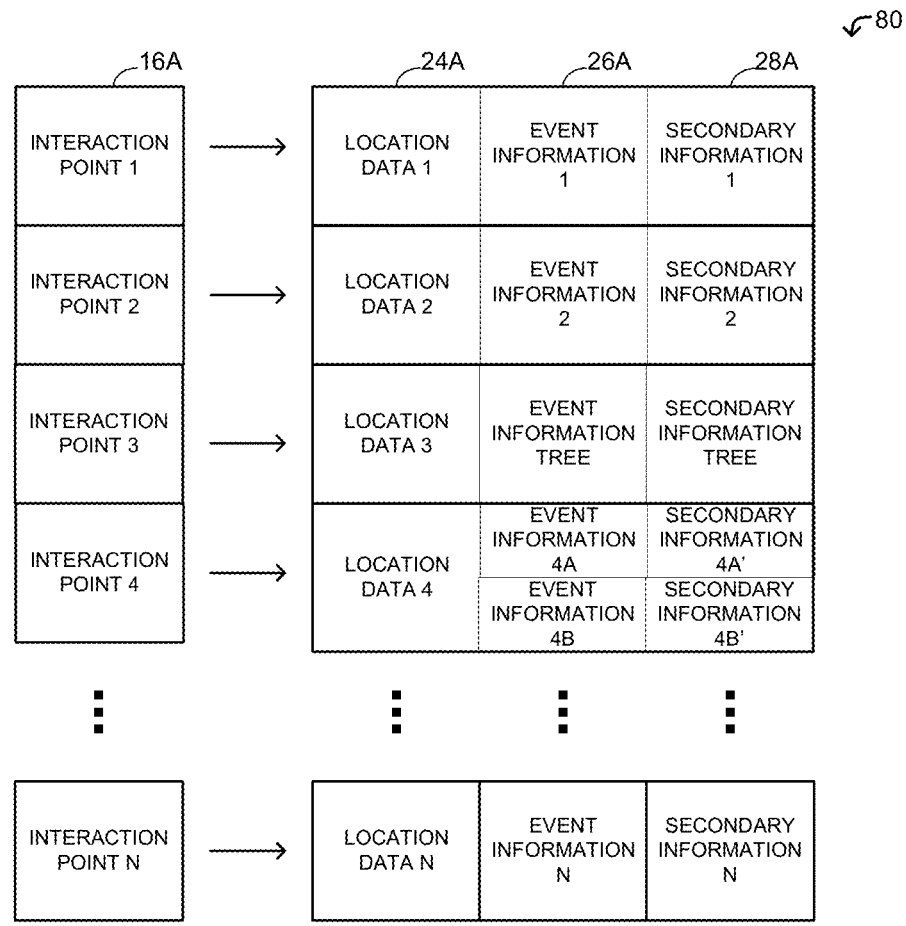
FIG. 5 illustrates a interaction point map according to present principles.

FIG. 5 illustrates a more detailed set of interaction points, herein termed an interaction map 80. Interaction map 80 provides for different types of content, metadata, user interactions, and other variations that affect the system operation, network operation, and user experience. In this implementation, the metadata for content data is stored as an interaction map 80 for the content data as divided, in FIG. 5, into N subsets with corresponding interaction points 16A, 16B, . . . , 16N. The interaction map 80 is a collection or list of these interaction points. Each interaction point indicates a location denoted location 24A, 24B, . . . , 24N, in the content data, such as time, video frame, visual or audio watermark or fingerprint, video tag, other metadata tag, or data pattern. Each interaction point 16 also has associated event information 26A, 26B, . . . , 26N to indicate how to process the interaction point. Examples of events include, but are not necessarily limited to, prompts, questions, notifications, updates, and branches. Events can also have secondary information, such as answers for questions, values of answers, effects of responses, indications of which branch to take based on response, and so on. Events can be conditional, such that the event may or may not occur depending on other information. For example, an event may not occur if the user has not achieved a certain score. As shown in the figure, an interaction point can have more than one associated event or a series of events, e.g., interaction point 4 includes event information 4A associated with secondary information 4A' along with additional event information 4B associated with secondary information 4B'. In one example an interaction point can have a tree of events each with its own conditions and actions to perform depending on the state of the participation system and the user input; this potentiality is shown as associated with location data 3. In another example, the conditions or values of event information can be evaluated against the data in the recorded data. In one such case, an interaction map could be created for one set of recorded data and then re-used with another set of data by appropriate use of conditions and assessment of recorded data.

Figure 6:
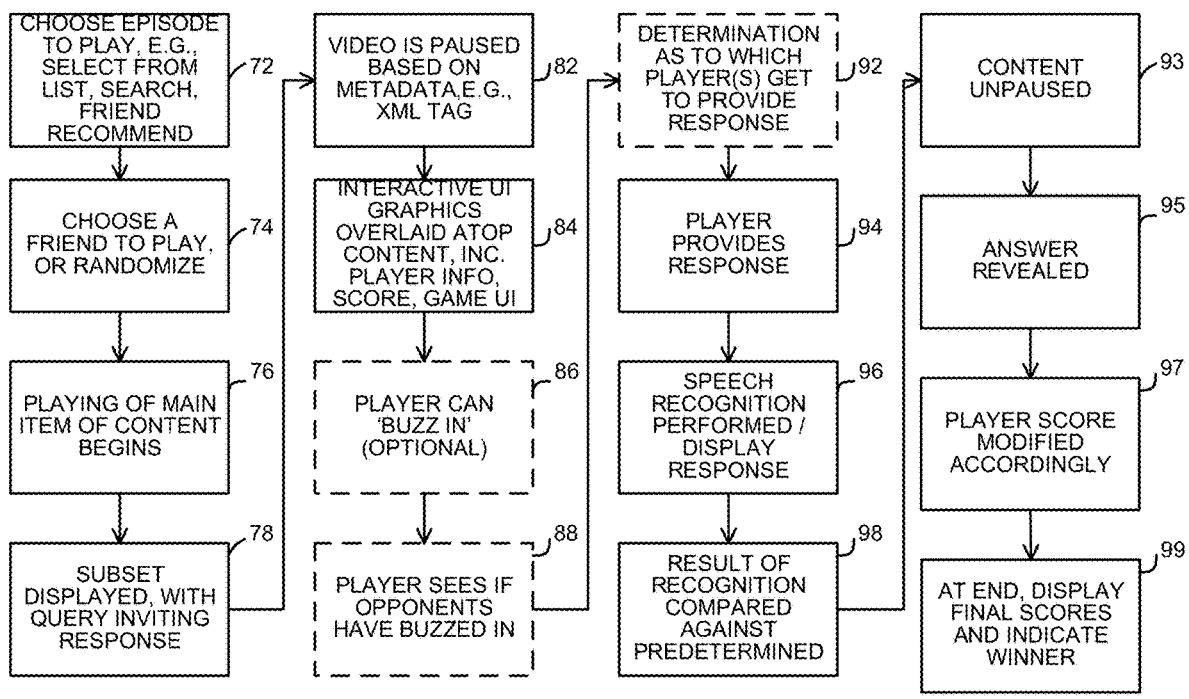
FIG. 6 another implementation of is a flowchart of a method according to present principles.

Or FIG. 6 illustrates a flow chart of an exemplary implementation. In a first step, a user chooses an episode to play, e.g., from among a list, or the user may search for a particular show and episode, one may be recommended for the user from a friend, or the like (step 72). In one implementation, a user selects a video to play using the user computer, e.g., mobile device. In another example, the system presents a list or collection of episodes of a game show and the user selects an episode. The system presents identifying and summary information to assist selection. The system may provide a search function to locate content items, e.g., by date, name, keyword, and so on. The system may make recommendations, e.g., based on past experience or on social information, such as friend recommendations, friend activity, and so on. The UI interaction can be presented and controlled on the television, the mobile display, or a combination.

In a next step, a user may choose a friend to play, or may play against a random opponent (step 74). Particularly if the user selects a random opponent, the random opponent may have played the game previously, and their responses and response time may be stored. The user may still play against the previously recorded opponent, either by playing solo and determining which player achieved a higher score, or, in a more complex implementation, using the random opponent's response time and determining if a current user "buzzes in" before the pre-recorded opponent, which would indicate more accurately which player would prevail if they were playing contemporaneously. In some cases, a time delay may be provided in such situations, so as to provide a handicap for one opponent or the other.

Returning to step 74, the user may select opponents using the mobile device. The system may present a list of people, such as the user's friends, recent users, or other known users.

The system may determine available opponents by requesting and receiving data from the server. The system can compare past performance or other profile information to select players to present or recommend, e.g., by equating skill levels. The user can search for particular names or other characteristics. The system can further provide a "random opponent" button to allow user to request one or more opponents to fill out the game, e.g., selecting randomly or using profile matching.

As noted above, game play with other players may be asynchronous. Thus, the other players may have already played the game to completion before they are selected as opponents. The results of a user's game activity may be stored during gameplay and the collected results used for future play with other people. As one example, a user may desire to play whatever player scored highest in a given episode. In any case, for each selected opponent, the system retrieves from the server the play data for that opponent to use in the current playthrough with the current user, e.g., using the player data API. In another implementation, however, synchronous gameplay may also be used, allowing multiple live users to play simultaneously, or a combination of live and recorded opponents.

Referring back to FIG. 6, the playing of the main item of content may begin (step 76). Thus, in an implementation, the game begins and the system presents video content the playback may be similar to the same playback during typical viewing, i.e., without participation, until a tag or interaction point is reached. The content player presents the game UI on top of the video content, e.g., icons and scores for users of the interactive experience.

At some point a subset of the main item of content will be displayed, with a query inviting a response (step 78). The video may be paused based on metadata, e.g., an XML tag encountered or reached within the subset of content data (step 82). Thus, the system may pause playback when a tag is reached and prompt the user for a response to a query. In this game example, the game is played with a series of questions asked and presented in the video, which contestants then answer. A metadata tag may be inserted at each question in the video when the video content and metadata are prepared. The tag identifies a frame or timestamp in the video content and, when playback reaches that frame or time, the system pauses playback and prompts the user through the game UI, which is overlaid atop the content (step 84). In one example, the prompt is a visual and audio queue on the television and a visual cue on the mobile device. The user can respond to the prompt to indicate the user will answer the question, e.g., the user can "buzz in" (step 86). In some implementations, the user can simply answer using the voice API without a need to separately perform another act, e.g., to buzz in.

In some implementations, a player can see if other opponents have buzzed in (step 88). This may be an actual indication of a user desire to answer a question if other users are playing contemporaneously, or the same may represent a prerecorded player buzzing in at the time at which they buzzed in when the program was live (or at another time as dictated by the designer).

If multiple players buzz in, the system may determine which player gets to provide the response first (step 92) and thus which player has the first opportunity to score points. In many cases it will be the first player to buzz in. In this way, the user responds to the prompt or query. The mobile device or other such user computer h may present a visual prompt, such as a button on the device screen, and the user may activate the button, e.g., tap the button, to respond to the prompt, so as to buzz in. In another example, the user can respond in multiple ways, such as by using "yes" and "no" buttons to indicate whether the user will participate at this point in the game. The user may also speak a code word or phrase to initiate a "buzz in", e.g., "answer", or may simply speak the answer. In any case, the player provides a response (step 94).

The video player records the user's responses and adds the same a given to play data for the user. The system also presents information on the opponents in the game, providing icons in the game UI to indicate if the opponents will respond at this time or not, based on the play data for those opponents, which, as noted above, indicates for each question whether the opponent responded to that question when the opponent originally played the game.

As noted, in many implementations the user answers the question by voice. And thus a step may be performed of speech recognition (step 96). The transcribed answer may be displayed on the screen in some implementations, for user confirmation. However, in a fast-paced game, such a step may generally be omitted.

In a common implementation of systems and methods according to present principles, the interactive experience will be a game using a question-and-answer format, and the paused video may display the current question on the television display. The user may speak an answer which is recorded by the microphone of the mobile device and the same may process the audio of the user speech, or send the audio file to the cloud or other service for processing. Where local processing is employed, the mobile device provides the audio data to the video player and the video player, e.g., using the voice API, may analyze the audio data to determine what answer the user provided. In another example, the mobile device provides the speech processing and provides the resulting answer data to the video player. The answer is presented on the television, and optionally the mobile device, and is then evaluated against predefined responses, e.g., in metadata, for the question. The video player records the user's answer and may add it to play data for the user. In another example, other answering mechanisms may be used, including typing, multiple-choice, gesture, and so on.

The answer provided by the user is then compared against the predetermined results (step 98) to evaluate the answer. In an implementation, the video player may present the results of the question in the video, e.g., in some cases by un-pausing the content (step 93), and also present the correct answer (step 95). The correct answer may be presented by a contestant in the show if a contestant determined the right answer. A host may also present the right answer if no contestant answered correctly.

The video player may also determine the effect of the user's answer (step 97), such as by increasing the user score for a correct answer and decreasing the user score for an incorrect answer. The game UI updates to reflect changes in score for the user. The video player may record the score and added to play data for the user. The video player may also assess the play data for the opponents in the participation game, e.g., interactive experience, to determine if the opponent answered, if the answer was correct, and the effect on the opponent's score, again displaying updated information in the game UI.

At the conclusion of the game, in some cases after all subsets have been displayed and responded to, a final score of all players may be displayed and a winner indicated (step 99). When the video reaches the end of the game, the metadata may indicate that the game has concluded and the video player may assess the game data to determine and present the final results. Throughout the game, the user has answered various questions and the user's score, stored as a database entry as part of an array or database, has been updated accordingly. The final score for the user and each of the opponents, if any, are displayed and compared to determine a final winner for the game. The video player may store the user's final score and the win or loss and may add the data to the user's play data. The play data for the user is finalized and sent back to the server for use in future games with the same or other users.

Variations and details of the above systems and methods are now described.

In some cases the system may present an opportunity for a user to make a wager. At such a point in the playback, the metadata may indicate that the user can make a wager in addition to answering a question, e.g., wagering a certain number of points from the user score. The video player may then present prompts to the user in the game UI and on the mobile device, and the user can respond to accept the opportunity or not. If the user accepts and would like to make a wager, the video player may prompt the user for an amount, and the user can speak an amount to wager. The wager amount is processed similarly to the answer processing above, and then the playback continues, moving to the question and another prompt for user answer.

In another variation, the system may present a video image as part of a question. The metadata may indicate the video image to use, e.g., by frame number, and the system may pause playback to present the image. The video player may prompt the user as with other questions, and may process a response and answer as above.

The above-noted pausing and un-pausing generally requires significant frame control so that systems and methods can pause on a particular frame. Without complete frame control, pausing on a particular frame can become problematic. Prior systems have not dealt with this issue before, and thus even where user input has been provided, frame accuracy has been immaterial. For example, in the case of video games, frame accuracy is generally not noticeable when pausing. But for current systems and methods, it can become significantly noticeable. For example, if a clue is being shown in one frame and then the display is caused to pause, e.g., based on the presence of a predetermined XML tag, but the display pauses on a frame of a contestant instead of the clue, then home users can be hindered in providing a response. Thus, the above-noted metadata can be employed to inform at least in part the pausing of the frame, although even this has been found to be inaccurate. In one exemplary solution, after a main item of content is caused to pause, e.g., automatically or by a user buzzing in, metadata can be reviewed (using metadata) from a potential pause frame, and it can be determined if the frame is an appropriate pause frame, e.g., it shows a clue rather than a contestant. If the potential pause frame shows a contestant, then the potential pause can be overridden and the main item of content allowed to play for a few more frames, until a clue frame is again displayed, at which point the pause can take effect.

Voice processing and recognition may be performed in the cloud, although this is not strictly necessary. Voice processing and recognition could also be performed on any of the user devices, such as the user computer or content playback device, or on other systems that are accessible, e.g., on the local network. Smart speakers such as Google Home®, Amazon Echo®, or Microsoft Cortana® or Invoke™ may be employed, including those employing video as well as audio inputs and outputs. However, voice-recognition in the cloud can be more comprehensive and can be more tolerant or accepting of, e.g., mispronounced words, as the same provides considerably more power when the system is attempting to accommodate variations and answers, variations caused by accents and dialects, and so on, as well as when operations are occurring at scale. In some cases, cloud-based voice recognition is a primary or default method, while local processing can be performed if cloud-based recognition is unavailable.

One exemplary optimized way of performing voice recognition is through a cognitive service or an AI which reviews the query and determines or evaluates whether something that has been vocalized should be accepted. Such AI may be employed in advanced systems to determine if an alternative answer is still an appropriate and correct answer. The user entered data, e.g., vocalization, could be analyzed to determine if it is a proper derivation of what the right or predefined answer is. The cognitive service, AI, or other service can rapidly access dictionaries, e.g., including homophones, to determine if words sound like the right answer, within a given tolerance, which may be adjustable, and so on. In the particular case of a game show, the writers can fill out the variations and upload the same to the content server or other server operating the game. In this case, the main item of content, e.g., the game, and there is no necessity to download processing applications onto user devices, resulting in faster and more efficient processing. In other words, the main item of content can be streamed, user responses can be analyzed in the cloud, and the results streamed back down to the user. Such can also be employed to upload or provide modifications in real time. For example, if error checking or processing determines that a user computer is interpreting a word incorrectly, the content server can automatically modify what is judged as a correct answer, so that a particular user response is deemed acceptable instead of incorrect.

As the voice recognition functionality learns individual user's voices, situations may be provided for in-room multiplayer gaming, even with just a single content-playback-device-based microphone, because the voice recognition system can recognize different players, thus allowing multiple participants to play without the disambiguation provided by a separate microphone or other separate player-based voice input device.

Another significant technological challenge addressed by implementations of present systems and methods occurs when user-entered data is ambiguous, e.g., when users correct themselves, stammer, or utter multiple serial alternate responses. Systems and methods according to present principles can generally only determine if the words said correspond, or do not correspond, to that which is stored as predefined responses. Solutions include using the last in time, using only responses that are complete as compared to a predefined response, or using a combination of these.

The system and method may be fully implemented in any number of computing devices, such as to provide the creation and storing of metadata for content, and the presentation, operation, and user interface for applications and tools to experience and interact with the content and metadata. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices, although voice input sources are preferred. Data may also be input by way of an inserted memory chip, hard drive, flash drives, flash memory, optical media, magnetic media, or any other type of file-storing medium, and such may generally be employed where stored data from prior games and from prior users is employed. The outputs may be delivered to a user by way of a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., gaming consoles, personal computers, laptop computers, notebook computers, net book computers, handheld computers, personal digital assistants, mobile phones, smart phones, smart devices, wearables, smart watches, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method. In the above described system where interactive experiences are contemplated, the plural inputs may allow plural users to input relevant data at the same time.

While the invention herein disclosed is capable of obtaining the objects hereinbefore stated, it is to be understood that this disclosure is merely illustrative of the presently preferred embodiments of the invention and that no limitations are intended other than as described in the appended claims.

For example, while the setting of game shows has been described here, the invention can be used in a wide variety of settings. For example, children shows, especially educational shows, may particularly benefit. For example, the queries and prompts may be employed to prompt children to speak out and be interactive. Crime dramas may be another genre where users could speak out and try to take part in the experience, e.g., to help solve a crime or to inform branching of storylines.

Systems and methods can be employed using smart remotes, using augmented reality or virtual reality, in which case gestures may also be employed as an input mechanism, and so on.

Systems and methods may be advantageously employed as part of a multiplayer experience with multiple users playing together in the same room. Each user may have a mobile device, and each may be connected to the television and video player application. As questions are presented, users can elect to respond or not, e.g., "buzz in", but only the first user to respond can answer the question.

In another variation, the questions presented are not always the same as the questions in the game show itself. Instead, some questions are about the game, e.g., predictions about correct answers or scores, the contestants, e.g., trivia, where are they from, their next statement, or content discussed in the game.

In yet another implementation, the video content is not necessarily a game show, but instead may be a movie, television program, web program, recording of a live event, e.g., sports game, speech, lecture, and so on. In one example, metadata for a movie includes tags at points of interest for interaction, such as to answer questions or to speak quotes from the current scene. As with the game show questions, when playback reaches a tag, the video player pauses playback and prompts the user to interact, such as by presenting a question in the player UI. For example, the user could be prompted to answer questions about the plot, e.g., what happens next, who is the killer, etc., about the actors, e.g., who is this, what movie did they make next, etc., about the production, e.g., who was the director, what company made this effect, etc., or other trivia, e.g., what other movie did this restaurant appear in. The user may answer by voice and the answer may be processed and analyzed for correctness against the metadata or other source of predefined responses. In another example, the video player prompts the user to speak a line of dialog, e.g., what is this character about to say, and the user's speech is analyzed for correctness and performance. In another example, video playback does not pause as the questions are presented and answered. For example, a "real time" mode is provided where users input in real time with the streamed video. In a particular implementation, based on Wheel of Fortune, users may shout out possible answers in the Bonus Round at the same time at the real contestant is doing the same, e.g, the at-home user attempts to guess the answer before the real contestant does.

In another implementation, the recorded content is audio instead of video, such as a radio game show, podcast, radio program, etc. In one example, the interface can be presented and used with audio only, e.g., to be used when a video display is not available or convenient.

In another implementation, the video content is recorded video of gameplay in a computer or video game, e.g., video game streamers, "let's play" videos, or video capture from a game console. The metadata for the video game indicates points of interaction, such as decision points in the game, e.g., which path to take, what equipment to use, which pill to swallow, etc. When the playback reaches these points, the user can provide the user's prediction or suggestion of what to do and the system provides feedback on the result. For example, the system indicates what would have happened if the user's choice had been made, with text or video, e.g., branching video, in particular if there are multiple recordings of the same game being played. In another example, the gameplay video is a tutorial or guide and the user's responses are compared against what was actually done in the guide to determine how well the user is playing the game according to the guide. In one example, the video game player can interact with a game application to create new video representing the effect of a user choice and present the new video instead of the recorded video for a period or with the recorded video, e.g., overlay or blended. In another example, the video playback does not pause or change. In one such case, the metadata includes the user input from the recorded gameplay, e.g., which button on a game controller was pressed when, etc., and the video player records current user input during playback. The video player compares the metadata and the current user input to determine how closely the current user is matching the recorded input, e.g., for training.

In another implementation, some or all of the content data is generated rather than recorded. The generated data can be created before or during the playback. This generated data can be used in conjunction with conditional events to provide dynamic participation experiences.

In another implementation, recorded data is used with a virtual reality environment. Recorded and/or generated video can be used to show parts of the environment. Some parts of the environment can also be augmented or replaced with data from the metadata, the play data, e.g., opponent information, images, etc., or the user system, e.g., camera, microphone, sensors, etc.

In another variation, devices may be synchronized and thus used for play across a WiFi network by modifying the architecture such that users play through a cloud, e.g., server-to-server, and not actually locally. For example, each user device or user computer may access a server, and the accessed servers may communicate with each other, to accomplish the goal of multiple users playing against each other, even where the users are in the same room or connected to one or more WiFi networks. This technological improvement overcomes significant technical difficulties including firewalls and incompatibility issues between the multitude of input devices, network providers, and routers.

In another variation, with an appropriate tech stack, the systems may be played across multiple types of platforms, allowing players with disparate devices to play together.

Other variations will be understood, given the disclosures herein, including the figures and claims.

The invention claimed is:

1. A method of operating an interactive experience based on a main item of content in which one or more database entries, associated with users and based on user interactions within the interactive experience, are more effectively and accurately populated, the method comprising steps of:
    playing a main item of content on a user content playback device, the main item of content including one or more subsets of content, one or more of the subsets of content indicating a query and inviting a response by a user;
    during the playing of the main item of content, receiving user-entered data from a user computer, the user-entered data comprising a response to a query indicated by the subset of the main item of content;
    comparing the received user-entered data with a predefined response to the query;
    determining a user score based on a result of the comparison, and adding the determined user score to a total score associated with the user and stored as an entry in a database, and further comprising pausing the playing of the main item of content at a predetermined point within the playing of the subset, and unpausing the playing after the step of determining a user score;
    displaying the total score associated with the user; and
    repeating the receiving, comparing, determining, adding, and displaying, for one or more of the subsets indicating a query and inviting a response by the user.

2. The method of claim 1, further comprising receiving an indication from a user that the main item of video content should begin playback, and upon the receiving an indication, starting the playing.

3. The method of claim 1, wherein the playing a main item of content includes streaming a live item of video content.

4. The method of claim 1, wherein the playing a main item of content includes playing back a recorded item of video content.

5. The method of claim 1, wherein the user computer is a mobile device, laptop, or digital personal assistant.

6. The method of claim 1, wherein the user computer is integral with the user content playback device.

7. The method of claim 1, wherein the user-entered data is voice data or transcribed voice data.

8. The method of claim 7, further comprising performing voice recognition on the user entered data to transform the user entered data into first textual data, and wherein the predefined response is encoded as second textual data within the main item of content, and wherein the comparing is of the first textual data to the second textual data.

9. The method of claim 1, further comprising
    during the playing of the main item of content, receiving another user-entered data from another user computer, the another user-entered data comprising another response to the query indicated by the subset of the main item of content;
    comparing the received another user-entered data with the predefined response to the query;
    determining a user score for the another user computer based on a result of the comparison, and adding the determined user score to a total score stored as an entry in a database associated with the another user;
    displaying the total score; and
    repeating the receiving, comparing, determining, and displaying, for a plurality of the subsets indicating a query and inviting a response by the another user.

10. The method of claim 1, wherein if no response is received from the user within a predetermined time subsequent to the pausing, then unpausing the playing of the main item of content after an expiration of the predetermined time.

11. The method of claim 1, wherein the playing a main item of content includes receiving and rendering data corresponding to the main item of content, and wherein a set of data indicating the predefined response is included in the received data.

12. The method of claim 11, wherein the set of data indicating the predefined response is encoded as metadata within an associated subset.

13. The method of claim 1, wherein the set of data indicating the predefined response is received as part of a transmission that is separate from a transmission causing the playing of the main item of content.

14. The method of claim 1, wherein the query inviting a response indicated by the subset, and the displaying, are rendered as an overlay atop the playing of the main item of content.

15. The method of claim 1, further comprising:
    during the playing of the main item of content, retrieving a previously-entered user-entered data corresponding to another user, the previously-entered user-entered data comprising another response to the query indicated by the subset of the main item of content;
    comparing the previously-entered user-entered data with the predefined response to the query;
    determining a user score for the another user based on a result of the comparison, and adding the determined user score for the another user to a total score for the another user stored as an entry in a database associated with the another user;
    displaying the total score for the another user;
    repeating the receiving, comparing, determining, and displaying, for a plurality of the subsets indicating a query for the another user.

16. The method of claim 15, wherein the another user is selected by the user.

17. The method of claim 15, wherein the another user is randomly selected for the user.

18. The method of claim 1, wherein the main item of content is embodied as content data, and wherein the playing of the main item of content constitutes rendering the content data with an appropriate audio and/or video codec.

19. The method of claim 18, further comprising storing metadata pertaining to the interactive experience as an interaction map, the interaction map comprising a collection or list of interaction points, each interaction point indicating a location in the content data.

20. The method of claim 19, wherein each subset corresponds to an interaction point.

21. The method of claim 19, wherein the location in the content data is represented using an element selected from the group consisting of: a time, a video frame, a visual or audio watermark or fingerprint, a video tag, a metadata tag, or a data pattern.

22. The method of claim 21, further comprising associated with each interaction point at least one associated event information, the associated event information indicating how to process the interaction point.

23. The method of claim 22, wherein the associated event information is selected from the group consisting of: a prompt, a question, a notification, an update, a condition, and a branch.

24. The method of claim 23, wherein the associated event information further comprises secondary information, and wherein the secondary information is selected from the group consisting of: an answer to a question, a value of an answer, an effect of a response, a condition, and an indication of a branch to take based on a response.

25. The method of claim 24, wherein the secondary information is a condition, and wherein the condition is that the associated event will or will not occur based on an occurrence of the condition.

26. The method of claim 19, wherein each interaction point is associated with a tree of events, each event having at least one associated condition and one associated action to perform based on an occurrence of the condition.

27. The method of claim 26, wherein the associated action to perform is further based on a state of the interactive experience and user input.

28. A system for operating an interactive experience based on a main item of content in which one or more database entries, associated with users and based on user interactions within the interactive experience, are more effectively and accurately populated, comprising:
a content player, the content player configured to play a main item of content on a user content playback device, the main item of content including one or more subsets of content, one or more of the subsets of content indicating a query and inviting a response by a user;
a programmed processor configured to operate an interactive experience;
a user application programming interface [API] configured to receive user-entered data from a user computer, the user-entered data comprising a response to a query indicated by the subset of the main item of content, the user API further configured to transmit the user-entered data to the programmed processor;
wherein the programmed processor is further configured to compare the received user-entered data with a predefined response to the query, to determine a user score based on a result of the comparison, and to add the determined user score to a total score associated with the user and stored as an entry in a database, and wherein the programmed processor is further configured to pause the playing of the main item of content at a predetermined point within the playing of the subset, and to unpause the playing after the step of determining a user score;
wherein the programmed processor is further configured to operate a user interface for the interactive experience, and to display the total score as a portion of the user interface.

29. The system of claim 28, wherein the system is distributed.

30. The system of claim 29, wherein the content player, the programmed processor, and the user API are on one or more computers within a local network, and the main item of content is streamed from a content server.

31. The system of claim 28, wherein the user API is a voice API.

32. The system of claim 31, wherein the voice API is further configured to transmit user entered voice data to a cloud server for voice recognition.

33. A method of operating an interactive experience based on a main item of content in which one or more database entries, associated with users and based on user interactions within the interactive experience, are more effectively and accurately populated, the method comprising steps of:
playing a main item of content on a user content playback device, the main item of content including one or more subsets of content, one or more of the subsets of content indicating a query and inviting a response by a user;
during the playing of the main item of content, receiving user-entered data from a user computer, the user-entered data comprising a response to a query indicated by the subset of the main item of content;
during the playing of the main item of content, retrieving a previously-entered user-entered data corresponding to another user, the previously-entered user-entered data comprising another response to the query indicated by the subset of the main item of content;
comparing the previously-entered user-entered data with the predefined response to the query;
determining a user score for the another user based on a result of the comparison, and adding the determined user score to a total score stored as an entry in a database associated with the another user;
comparing the received user-entered data with a predefined response to the query;
determining a user score based on a result of the comparison, and adding the determined user score to a total score associated with the user and stored as an entry in a database;
displaying the total score for the user and for the another user; and
repeating the receiving, comparing, determining, adding, and displaying, for one or more of the subsets indicating a query and inviting a response by the user; and
repeating the receiving, comparing, determining, and displaying, for a plurality of the subsets indicating a query for the another user.

* * * * *